United States Patent
Li et al.

(10) Patent No.: US 12,304,842 B2
(45) Date of Patent: May 20, 2025

(54) METHOD FOR RECOVERING PHOSPHORUS FROM SLUDGE RICH IN CHEMICAL PHOSPHORUS PRECIPITATES USING HIGH-PROTEIN BIOMASS WASTE

(71) Applicant: TONGJI UNIVERSITY, Shanghai (CN)

(72) Inventors: Yongmei Li, Shanghai (CN); Zhipeng Zhang, Shanghai (CN); Qian Ping, Shanghai (CN); Wenjie Guo, Shanghai (CN); Lin Wang, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 409 days.

(21) Appl. No.: 17/861,322

(22) Filed: Jul. 11, 2022

(65) Prior Publication Data
US 2023/0008207 A1 Jan. 12, 2023

(30) Foreign Application Priority Data
Jul. 12, 2021 (CN) .......................... 202110782246.9

(51) Int. Cl.
*C02F 11/04* (2006.01)
*C01B 25/00* (2006.01)
(Continued)

(52) U.S. Cl.
CPC ............ *C02F 11/04* (2013.01); *C01B 25/003* (2013.01); *C02F 11/122* (2013.01); *C02F 11/127* (2013.01); *C02F 11/143* (2019.01)

(58) Field of Classification Search
None
See application file for complete search history.

(56) References Cited

FOREIGN PATENT DOCUMENTS

| CN | 103204613 A | 7/2013 |
|---|---|---|
| CN | 103936249 A | 7/2014 |

(Continued)

OTHER PUBLICATIONS

Zhang et al, "Simultaneous Nitrogen and Phosphorus Recovery from Sludge-Fermentation Liquid Mixture and Application of the Fermentation", Environ. Sci. Technol. 2009, 43, 6164-6170 (Year: 2009).*

(Continued)

*Primary Examiner* — Krishnan S Menon
(74) *Attorney, Agent, or Firm* — troutman pepper locke; Tim Tingkang Xia, Esq.

(57) ABSTRACT

Disclosed is a method for recovering phosphorus from sludge rich in chemical phosphorus precipitates using a high-protein biomass waste, comprising introducing the sludge rich in chemical phosphorus precipitates into an anaerobic fermenter, adding a certain amount of a high-protein biomass by-product, sealing the fermenter and fermenting for 4-7 days. The method can effectively increase the phosphorus release efficiency from the sludge, and also generate volatile short-chain fatty acids and ammonia nitrogen in high concentrations. After dewatering, phosphorus and part of ammonia nitrogen can be recovered in a form of high-purity struvite crystals only by addition of a magnesium salt and adjustment of pH to 7.5-9.0. The volatile short-chain fatty acids can be used as an economical carbon source. The method allows simultaneous utilization of two solid wastes to recover carbon, nitrogen and phosphorus resources, and can reduce the usage of chemical reagents, saving the treatment cost.

5 Claims, 4 Drawing Sheets

(51) Int. Cl.
    *C02F 11/122*     (2019.01)
    *C02F 11/127*     (2019.01)
    *C02F 11/143*     (2019.01)

(56) References Cited

FOREIGN PATENT DOCUMENTS

| | | | | |
|---|---|---|---|---|
| CN | 108046557 A | | 5/2018 | |
| CN | 110877953 A | * | 3/2020 | |
| CN | 113023702 A | * | 6/2021 | ........... C01B 25/375 |

OTHER PUBLICATIONS

Zurzolo et al, "Increase of Soluble Phosphorus and Volatile Fatty Acids During Co-fermentation of Wastewater Sludge", Waste Biomass Valor (2016) 7:317-324 (Year: 2016).*

Li et al, "Recovery of phosphorus and volatile fatty acids from wastewater and food waste with an iron-flocculation sequencing batch reactor and acidogenic cofermentation," Bioresource Technology 245 (2017) 615-624 (Year: 2017).*

Guney et al, "Phosphorus recovery from digested sewage sludge as MAP by the help of metal ion separation," wat e r re s e a r c h 4 2( 2 0 0 8 ) 4 6 9 2-4 6 9 8 (Year: 2008).*

* cited by examiner

METHOD FOR RECOVERING PHOSPHORUS FROM SLUDGE RICH IN CHEMICAL PHOSPHORUS PRECIPITATES USING HIGH-PROTEIN BIOMASS WASTE

CROSS-REFERENCE TO RELATED PATENT APPLICATION

This non-provisional application claims priority to and the benefit of, pursuant to 35 U.S.C. § 119(a), patent application Serial No. CN202110782246.9 filed in China on Jul. 12, 2021. The disclosure of the above application is incorporated herein in its entirety by reference.

FIELD

The present disclosure belongs to the field of sludge disposal and resource treatment, and in particular relates to a method for recovering phosphorus from sludge rich in chemical phosphorus precipitates using a high-protein biomass waste.

BACKGROUND

Phosphorus is one of the most important nutrient elements for life and plays an irreplaceable key role in plant growth and food production. In 2050, the global population is estimated to exceed 9.1 billion, and the crop yield will need to be increased by 70%-100% than today to meet the food and clothing needs of human at that time. The main source of phosphorus is phosphate rock, which as a non-renewable resource, is being increasingly depleted with exploitation by human. On the other hand, about 3 million tons of phosphorus enters domestic sewage every year. In order to prevent eutrophication of natural water, the domestic sewage needs to be treated to meet the standard before it can be discharged. Therefore, wastewater produced by some human activities such as domestic sewage, aquaculture wastewater, and fertilizer production wastewater, which contains a large amount of phosphorus, is a potential phosphorus resource that has not yet effectively utilized. Studies have shown that phosphorus recovery from municipal sewage can meet 15%-20% of the phosphorus needs in the world. If phosphorus can be recovered from sewage, it can not only alleviate the shortage of the phosphorus resources, but also fundamentally solve the problem of water eutrophication, which is of great significance.

In recent years, in order to increase the protection of water resources, the requirements on phosphorus discharge in sewage have gradually increased. Many sewage treatment plants, through upgrading and reconstruction thereof, have added a chemical phosphorus removal process on the basis of enhanced biological phosphorus removal. The commonly used reagents for chemical phosphorus removal include iron or aluminum salts, which react with phosphorus in water to generate insoluble iron phosphate or aluminum phosphate precipitates, respectively. After the sewage is treated, more than 90% of the phosphorus is transferred to the sludge. Therefore, the essence of sewage phosphorus recovery is to recover phosphorus from sludge. At present, a commonly used method for recovering phosphorus from sludge is anaerobic fermentation to release phosphorus, and then recovering phosphorus from the supernatant by means of precipitation or crystallization. The anaerobic fermentation can not only promote sludge stabilization, reduction and resource utilization, but also recover phosphorus resources in a form of high-purity struvite, etc., which has broad application prospects. However, anaerobic fermentation from sludge rich in chemical phosphorus precipitates has a phosphorus release efficiency less than 10%, which is difficult to achieve the purpose of recovering phosphorus resources. Therefore, it is necessary to develop a method for improving the phosphorus release efficiency by anaerobic fermentation from sludge rich in chemical phosphorus precipitates, so as to efficiently recover phosphorus resources from the sludge rich in chemical phosphorus precipitates.

At present, the method for improving the phosphorus release efficiency by anaerobic fermentation from sludge rich in chemical phosphorus precipitates is mainly addition of chemical reagents, such as addition of strong acid and strong alkali reagents to change pH of the sludge, such that the phosphorus-containing precipitates are dissolved to release phosphorus. "Method for extracting phosphorus element in phosphorus-containing chemical-biological mixed sludge" (Patent Application No.: 201310127591.4) discloses a technology of adjusting and maintaining pH of the phosphorus-containing chemical-biological mixed sludge at 2-8 with hydrochloric acid and sodium hydroxide solutions, and subjecting it to anaerobic digestion at 30-50° C. for 7 days to effectively release phosphorus. However, in actual engineering, for maintaining the anaerobic digestion system in an acidic environment, the equipment corrosion protection and costs of the reagents need to be taken into consideration, and the dissolution of various metal ions is disadvantageous to subsequent phosphorus recovery. "Method for improving phosphorus release efficiency by anaerobic fermentation from phosphorus-containing chemical-biological mixed sludge" (Patent Application No.: 201410120041.4) discloses a technology of adding a disodium ethylenediamine-tetraacetate complexing agent to form complexes with various metal ions in the sludge, which promotes the release of phosphorus in the chemical phosphorus precipitates such as iron phosphate and aluminum phosphate, and also prevents the reprecipitation of the phosphorus released by anaerobic fermentation of the sludge. However, disodium ethylenediamine-tetraacetate has a certain toxicity, which destroys the structure of cells, inhibits microbial activity, and is disadvantageous to anaerobic fermentation of the sludge to produce acid and gas. In order to overcome this technical defect, the Patent Application No.: 201710854846.5, entitled "Method for promoting phosphorus release and gas production from phosphate precipitate-containing sludge at room temperature", proposes that trisodium citrate is added to the phosphate precipitate-containing sludge before anaerobic fermentation, which can not only improve the phosphorus release efficiency from the sludge, but also promote the acid and methane production from the anaerobic fermentation of the sludge. However, this technology has a poor effect on improving the phosphorus release amount from the phosphate precipitate-containing sludge, since the phosphorus release amount from the sludge with the addition of trisodium citrate is only increased by 18%-25% than that without the addition of trisodium citrate. In order to overcome the above defects in the prior art, the present disclosure provides a more economical and environmentally friendly method for recovering phosphorus from sludge rich in chemical phosphorus precipitates by co-fermentation of a high-protein biomass waste and sludge, which effectively improves the phosphorus release efficiency and acid production by anaerobic fermentation from the sludge rich in chemical phosphorus precipitates, reduces the cost of chemical reagents, and recovers nitrogen and phosphorus resources in a form of high-purity struvite. The fermentation liquor obtained after the struvite is precipitated contains a high concentration of volatile short-chain fatty acids, which can be used as an economical carbon source to improve the removal efficiency of nutrient salts in sewage treatment plants. Such a method is simple, and is an effective means to realize waste control by waste and to realize a resource utilization of the sludge, having prospects in engineering applications.

SUMMARY

In view of the above defects, the present disclosure provides a method for recovering phosphorus from sludge rich in chemical phosphorus precipitates using a high-protein biomass waste, which can effectively improve the phosphorus release efficiency by anaerobic fermentation from the sludge rich in chemical phosphorus precipitates, reduce the cost of chemical reagents, and recover phosphorus in a form of high-purity struvite.

The present disclosure provides the following technical solutions: A method for recovering phosphorus from sludge rich in chemical phosphorus precipitates using a high-protein biomass waste is provided, which comprises steps of:
  (1) introducing the sludge rich in chemical phosphorus precipitates into an anaerobic fermenter, adding a high-protein biomass by-product in proportion according to a total chemical oxygen demand of the sludge, removing oxygen to form an anaerobic environment, sealing the fermenter, and co-fermenting the sludge and the high-protein biomass by-product at 25-35° C. for 4-7 days, to effectively release phosphorus from the sludge rich in chemical phosphorus precipitates;
  (2) dewatering the sludge after being co-fermented in the step (1) to obtain a dewatered sludge liquor; and
  (3) adding an appropriate amount of a magnesium salt to the dewatered sludge liquor obtained in the step (2), adjusting pH to 7.5-9.0, stirring for 30 minutes and then standing for precipitation to obtain struvite crystals, and recovering the phosphorus in a form of the struvite crystals from the sludge.

Further, the method is characterized in that the sludge rich in chemical phosphorus precipitates in the step (1) is excess sludge produced from a sewage treatment plant after chemical phosphorus removal by adding an iron salt or an aluminum salt, wherein the iron salt includes a divalent iron salt and a trivalent iron salt.

Further, the high-protein biomass by-product in the step (1) is an inefficiently utilized high-protein biomass waste that is generated during product processing, such as silkworm chrysalis powder, corn gluten powder, soybean powder, and wheat gluten powder.

Further, the high-protein biomass by-product in the step (1) is added, according to the total chemical oxygen demand of the sludge, in an amount of 0.5-1.0 g of a total chemical oxygen demand of the high-protein biomass by-product per gram of the total chemical oxygen demand of the sludge.

Further, the dewatering of the sludge in the step (2) is performed by means of mechanical dewatering, including pressure filtration or centrifugation.

Further, magnesium chloride or magnesium oxide is added into the dewatered sludge liquor in the step (3) as the magnesium salt, in an appropriate amount controlled such that the molar ratio of $PO_4^{3-}/Mg^{2+}$ is 1:1-1:2.

The present disclosure has the following advantageous effects:
  1. The method provided in the present disclosure is carried out by co-fermentation of a high-protein biomass by-product and sludge rich in chemical phosphorus precipitates, which can effectively improve the phosphorus release efficiency by anaerobic fermentation from the sludge rich in chemical phosphorus precipitates, and realize the recovery of phosphorus resources. The pH of the anaerobic reaction system is weakly acidic or neutral, which can avoid equipment corrosion problems caused by strong acid or strong alkali treatments.
  2. The method provided in the present disclosure, that is, co-fermentation of sludge rich in chemical phosphorus precipitates and a high-protein biomass by-product, can not only effectively release phosphorus, but also generate volatile short-chain fatty acids and ammonia nitrogen in high concentrations due to the hydrolysis of a large amount of protein in the anaerobic reaction system. The volatile short-chain fatty acids can be used as an economical carbon source to improve the removal efficiency of nutrient salts in a sewage treatment plant, and the ammonia nitrogen can be used to form struvite crystals such that phosphorus and part of ammonia nitrogen can be recovered only by additional addition of a magnesium source and adjustment of pH. In addition, the ammonia nitrogen in a high concentration can neutralize the acidic effect of the volatile short-chain fatty acids, such that the system has a pH close to neutral pH, which effectively reduces the amount of an alkali solution used in the recovery of nitrogen and phosphorus from the dewatered liquor. Therefore, the present disclosure can not only realize the recovery of carbon, nitrogen and phosphorus resources from the sludge, but also reduce the usage of chemical reagents, thereby saving the treatment cost.
  3. The high-protein biomass by-product used in the method provided in the present disclosure is generally an inefficiently utilized high-protein biomass waste that is generated during product processing, and is low in cost. The present disclosure allows simultaneous utilization of two solid wastes.
  4. The step (3) in the method provided in the present disclosure, that is, adding an appropriate amount of a magnesium salt to the resulting dewatered sludge liquor, adjusting pH to 7.5-9.0, stirring for 30 minutes and standing for precipitation to obtain struvite, is an effective supplement to the anaerobic fermentation technology. Therefore, in actual use, only some precipitation, reagent administering and other facilities need to be added, which is easy to implement, and has prospects in engineering applications.

BRIEF DESCRIPTION OF DRAWINGS

Hereinafter, the present disclosure will be described in more detail on the basis of examples and with reference to the accompanying drawings, in which.

DETAILED DESCRIPTION

Technical solutions in the examples of the present disclosure will be clearly and completely described hereinafter in conjunction with the accompanying drawings in the examples of the present disclosure. Obviously, the described examples are only a part of the examples of the present disclosure, rather than all of them. All the other examples, which are based on the examples in the present disclosure, obtained by those of ordinary skill in the art without creative labor, should fall within the protection scope of the present disclosure.

Example 1

450 mL of pure biological sludge was introduced into an anaerobic fermenter, and 0.65 g of iron phosphate was added thereto to simulate the sludge rich in chemical phosphorus precipitates. 2.44 g of silkworm chrysalis powder was added to the sludge (i.e., 0.81 g of a total chemical oxygen demand of silkworm chrysalis powder per gram of a total chemical oxygen demand of the sludge was added). Oxygen was removed to form an anaerobic environment, and the fermenter was sealed. Thereafter, it was subjected to anaerobic co-fermentation at 35° C. for 7 days. Meanwhile, iron phosphate-containing sludge without adding the silkworm chrysalis powder was used as a control.

Figure 1:
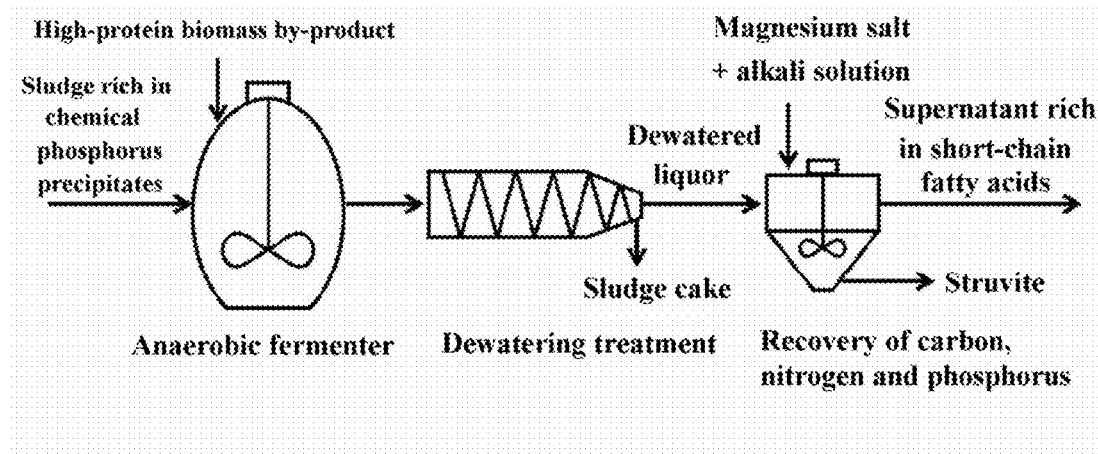
FIG. 1 is a process schematic diagram of the method for recovering phosphorus from sludge rich in chemical phosphorus precipitates of the present disclosure.
Figure 2:
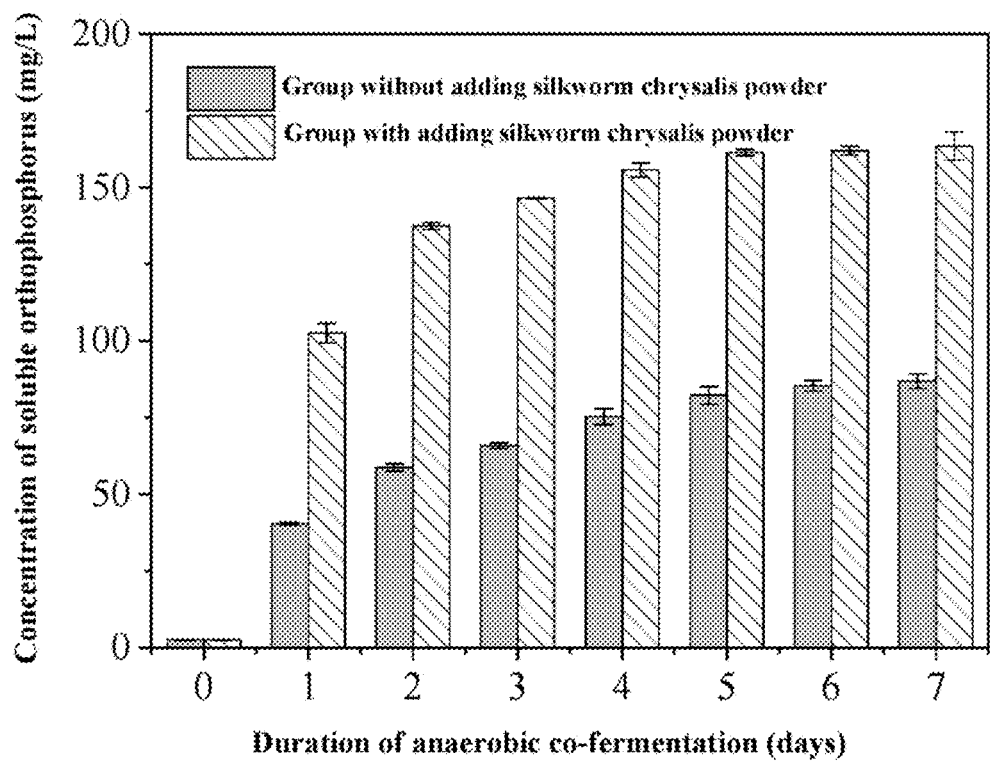
FIG. 2 is a diagram of the change in phosphorus release amount during the anaerobic co-fermentation of silkworm chrysalis powder and a simulated iron phosphate-containing sludge in Example 1 of the present disclosure.
Figure 3:
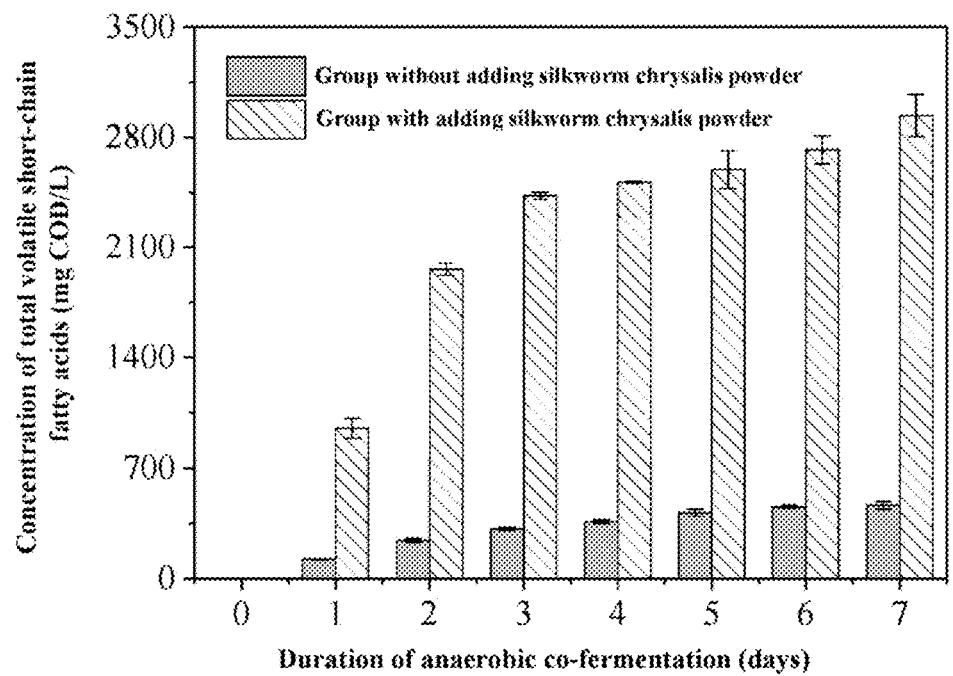
FIG. 3 is a diagram of the concentration change in volatile short-chain fatty acids during the anaerobic co-fermentation of silkworm chrysalis powder and a simulated iron phosphate-containing sludge in Example 1 of the present disclosure.
Figure 4:
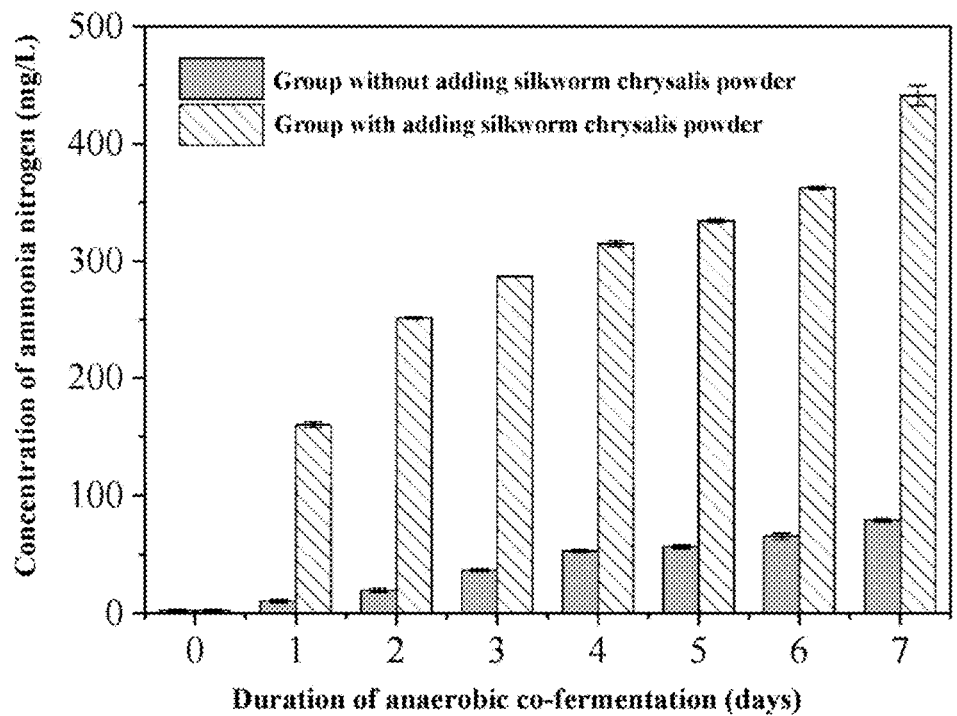
FIG. 4 is a diagram of the concentration change in ammonia nitrogen during the anaerobic co-fermentation of silkworm chrysalis powder and a simulated iron phosphate-containing sludge in Example 1 of the present disclosure.

Referring to FIGS. 2-4, the concentration of soluble orthophosphorus after the co-fermentation of the silkworm chrysalis powder and the iron phosphate-containing sludge for 7 days was increased by 88% compared with that of the iron phosphate-containing sludge without adding the silkworm chrysalis powder. The concentration of total volatile short-chain fatty acids after the co-fermentation of the silkworm chrysalis powder and the iron phosphate-containing sludge for 7 days was increased by 531% compared with that of the iron phosphate-containing sludge without adding the silkworm chrysalis powder.

The sludge obtained after the anaerobic co-fermentation for 7 days was dewatered by means of centrifugation, and magnesium chloride was added to the resulting dewatered liquor in an appropriate amount to control the molar ratio of $PO_4^{3-}/Mg^{2+}$ to be 1:1.1, and the pH was adjusted to 8.5. Thereafter, it was stirred for 30 minutes and left for precipitation to obtain struvite crystals, and phosphorus was recovered in a form of the struvite crystals from the sludge.

Example 2

450 mL of excess activated sludge rich in iron phosphate from a sewage treatment plant was introduced into an anaerobic fermenter, and 5.67 g of silkworm chrysalis powder was added to the sludge (i.e., 0.81 g of a total chemical oxygen demand of silkworm chrysalis powder per gram of a total chemical oxygen demand of the sludge was added). Oxygen was removed to form an anaerobic environment, and the fermenter was sealed. Thereafter, it was subjected to anaerobic co-fermentation at 35° C. for 7 days. Meanwhile, iron phosphate-containing sludge without adding the silkworm chrysalis powder was used as a control.

Figure 5:
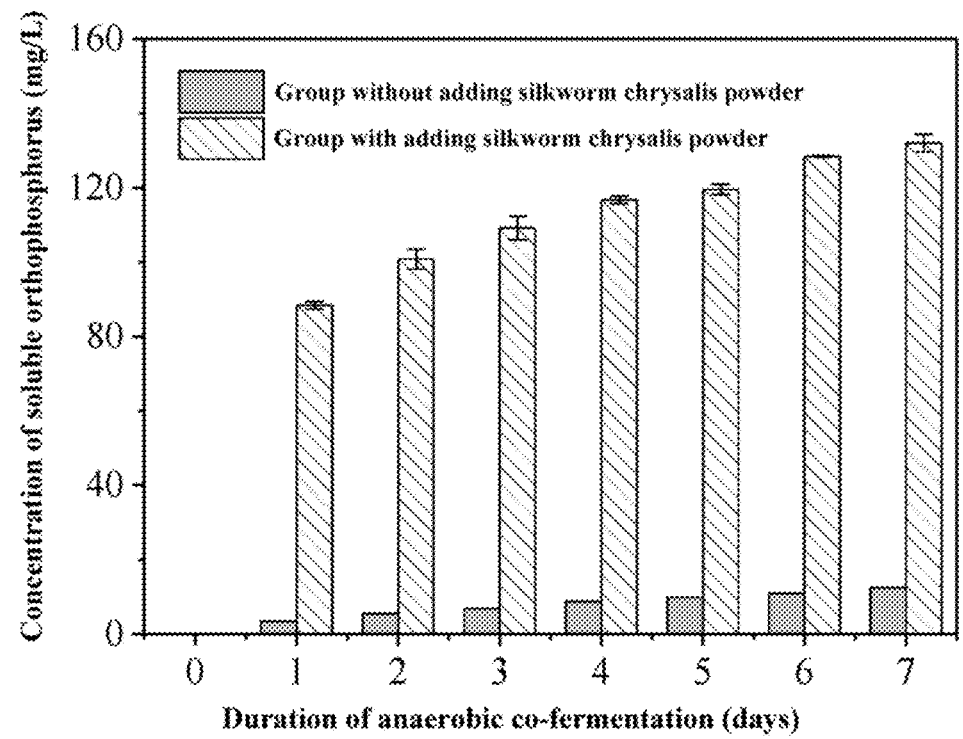
FIG. 5 is a diagram of the change in phosphorus release amount during the anaerobic co-fermentation of silkworm chrysalis powder and an iron phosphate-containing sludge from a sewage treatment plant in Example 2 of the present disclosure.
Figure 6:
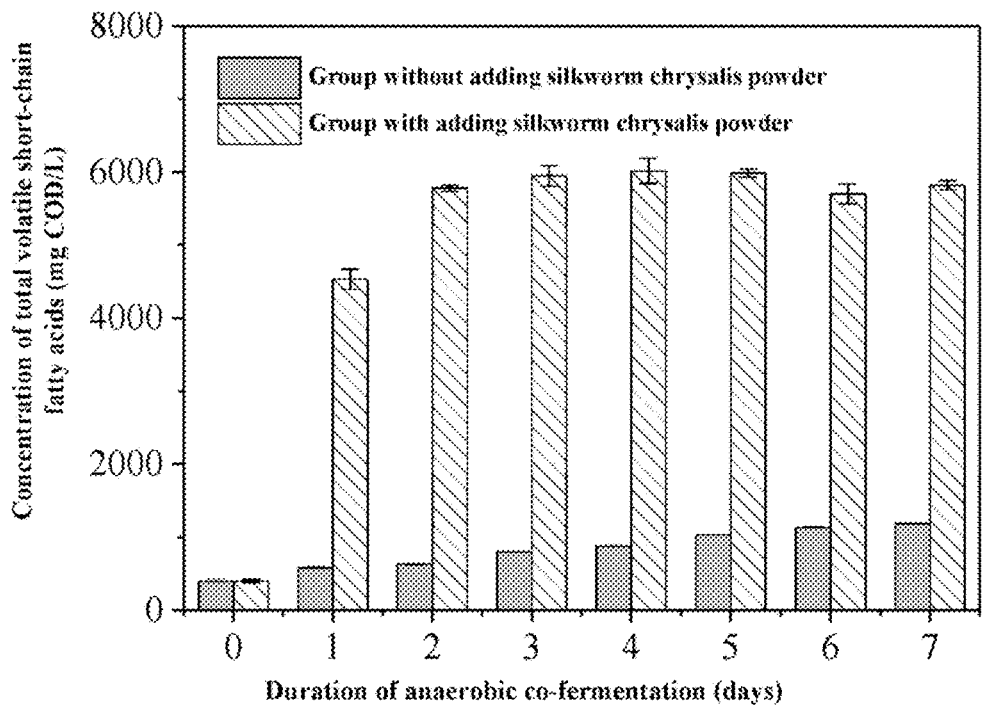
FIG. 6 is a diagram of the concentration change in volatile short-chain fatty acids during the anaerobic co-fermentation of silkworm chrysalis powder and an iron phosphate-containing sludge from a sewage treatment plant in Example 2 of the present disclosure.
Figure 7:
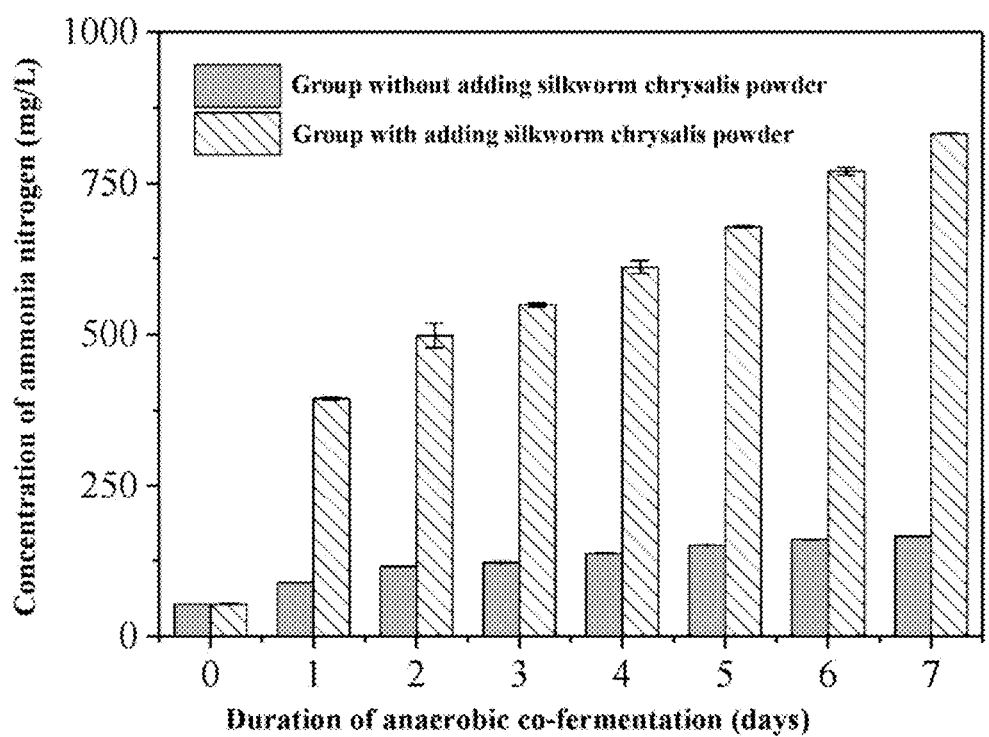
FIG. 7 is a diagram of the concentration change in ammonia nitrogen during the anaerobic co-fermentation of silkworm chrysalis powder and an iron phosphate-containing sludge from a sewage treatment plant in Example 2 of the present disclosure.

Referring to FIGS. 5-7, the concentration of soluble orthophosphorus after the co-fermentation of the silkworm chrysalis powder and the iron phosphate-containing sludge for 7 days was increased by 954% compared with that of the iron phosphate-containing sludge without adding the silkworm chrysalis powder. The concentration of total volatile short-chain fatty acids after the co-fermentation of the silkworm chrysalis powder and the iron phosphate-containing sludge for 7 days was increased by 391% compared with that of the iron phosphate-containing sludge without adding the silkworm chrysalis powder.

The sludge obtained after the anaerobic co-fermentation for 7 days was dewatered by means of centrifugation, and magnesium chloride was added to the resulting dewatered liquor in an appropriate amount to control the molar ratio of $PO_4^{3-}/Mg^{2+}$ to be 1:1.1, and the pH was adjusted to 8.5. Thereafter, it was stirred for 30 minutes and left for precipitation to obtain struvite crystals, and phosphorus was recovered in a form of the struvite crystals from the sludge.

The above examples are only intended to explain the technical solutions of the present disclosure, but not to limit the present disclosure. Although the present disclosure has been described in detail with reference to the above examples, those of ordinary skill in the art should understand that modifications can be made to the technical solutions recited in the above examples or equivalent replacements can be made to some or all of the technical features thereof, which modifications and equivalent replacements will not make the corresponding technical solutions deviate from the scope of the technical solutions in the examples of the present disclosure.

In addition, those skilled in the art shall understand that although some examples herein include some features rather than other features included in other examples, and that combinations of features in different examples are intended to fall within the scope of the present disclosure and constitutes different examples. For example, in the appended claims, any one of the claimed examples can be used in any combination. The information disclosed in the Background section is only intended to enhance the understanding of the general background of the present disclosure, and should not be taken as an acknowledgement or any form of suggestion that the information constitutes the prior art already well known to those skilled in the art.

What is claimed is:

1. A method for recovering phosphorus from sludge rich in chemical phosphorus precipitates using a high-protein biomass waste, comprising steps of:
   (1) introducing the sludge rich in chemical phosphorus precipitates into an anaerobic fermenter, adding a high-protein biomass waste in proportion according to a total chemical oxygen demand of the sludge, removing oxygen to form an anaerobic environment, sealing the fermenter, and co-fermenting the sludge and the high-protein biomass waste at 25-35° C. for 4-7 days, to effectively release phosphorus from the sludge rich in chemical phosphorus precipitates;

(2) dewatering the sludge after being co-fermented in the step (1) to obtain a dewatered sludge liquor; and (3) adding an appropriate amount of a magnesium salt to the dewatered sludge liquor obtained in the step (2), adjusting pH to 7.5-9.0, stirring for 30 minutes and then standing for precipitation to obtain struvite crystals, and recovering the phosphorus in a form of the struvite crystals from the sludge, wherein the high-protein biomass waste comprises silkworm chrysalis powder.

2. The method for recovering phosphorus from sludge rich in chemical phosphorus precipitates using a high-protein biomass waste according to claim 1, wherein the sludge rich in chemical phosphorus precipitates in the step (1) is produced from a sewage treatment plant.

3. The method for recovering phosphorus from sludge rich in chemical phosphorus precipitates using a high-protein biomass waste according to claim 1, wherein the high-protein biomass waste in the step (1) is added, according to the total chemical oxygen demand of the sludge, in an amount of 0.5-1.0 g of a total chemical oxygen demand of the high-protein biomass waste per gram of the total chemical oxygen demand of the sludge.

4. The method for recovering phosphorus from sludge rich in chemical phosphorus precipitates using a high-protein biomass waste according to claim 1, wherein the dewatering of the sludge in the step (2) is performed by means of mechanical dewatering, including pressure filtration or centrifugation.

5. The method for recovering phosphorus from sludge rich in chemical phosphorus precipitates using a high-protein biomass waste according to claim 1, wherein magnesium chloride or magnesium oxide is added into the dewatered sludge liquor in the step (3) as the magnesium salt, in an appropriate amount controlled such that the molar ratio of $PO_4^{3-}/Mg^{2+}$ is 1:1-1:2.

* * * * *